United States Patent [19]

Moran

[11] 4,228,886
[45] Oct. 21, 1980

[54] POSITION SENSOR

[75] Inventor: Raymond D. Moran, Springdale, Pa.

[73] Assignee: PPG Industries, Inc., Pittsburgh, Pa.

[21] Appl. No.: 973,307

[22] Filed: Dec. 26, 1978

[51] Int. Cl.³ .............................................. B65G 47/24
[52] U.S. Cl. ..................................... 198/395; 250/561;
271/84; 271/227; 356/375; 414/72; 414/730;
198/401
[58] Field of Search ......................... 198/395, 401, 341;
414/71, 72, 74, 70, 730; 271/84, 241, 265, 267,
227, 228; 250/561; 356/375

[56] References Cited

U.S. PATENT DOCUMENTS

| | | | |
|---|---|---|---|
| 3,618,742 | 11/1971 | Blanchard et al. | 198/395 |
| 3,881,605 | 5/1975 | Grossman | 414/730 |
| 3,890,509 | 6/1975 | Maxey | 250/561 |
| 4,105,925 | 8/1978 | Rossol et al. | 250/561 |
| 4,163,157 | 7/1979 | Guignard et al. | 250/561 |

FOREIGN PATENT DOCUMENTS

| | | | |
|---|---|---|---|
| 1307664 | 2/1973 | United Kingdom | 271/227 |
| 1322854 | 7/1973 | United Kingdom | 271/227 |

Primary Examiner—Jeffrey V. Nase
Attorney, Agent, or Firm—Donald Carl Lepiane

[57] ABSTRACT

A glass sheet is advanced into a sheet determining position with one side of the sheet intercepting two scan paths and the other adjacent side of the sheet intercepting one of the two scan paths. Light rays reflected from the portion of the scan paths occupied by the sheet are incident on selected photodetectors which generate a plurality of signals. The signals are acted on to determine orientation of the sheet relative to a reference plane. The information is forwarded to the program of an industrial robot to alter the path of the robot arm to position a pick up frame mounted on the arm over the sheet. Thereafter the frame engages the sheet to load same in a shipping container.

13 Claims, 5 Drawing Figures

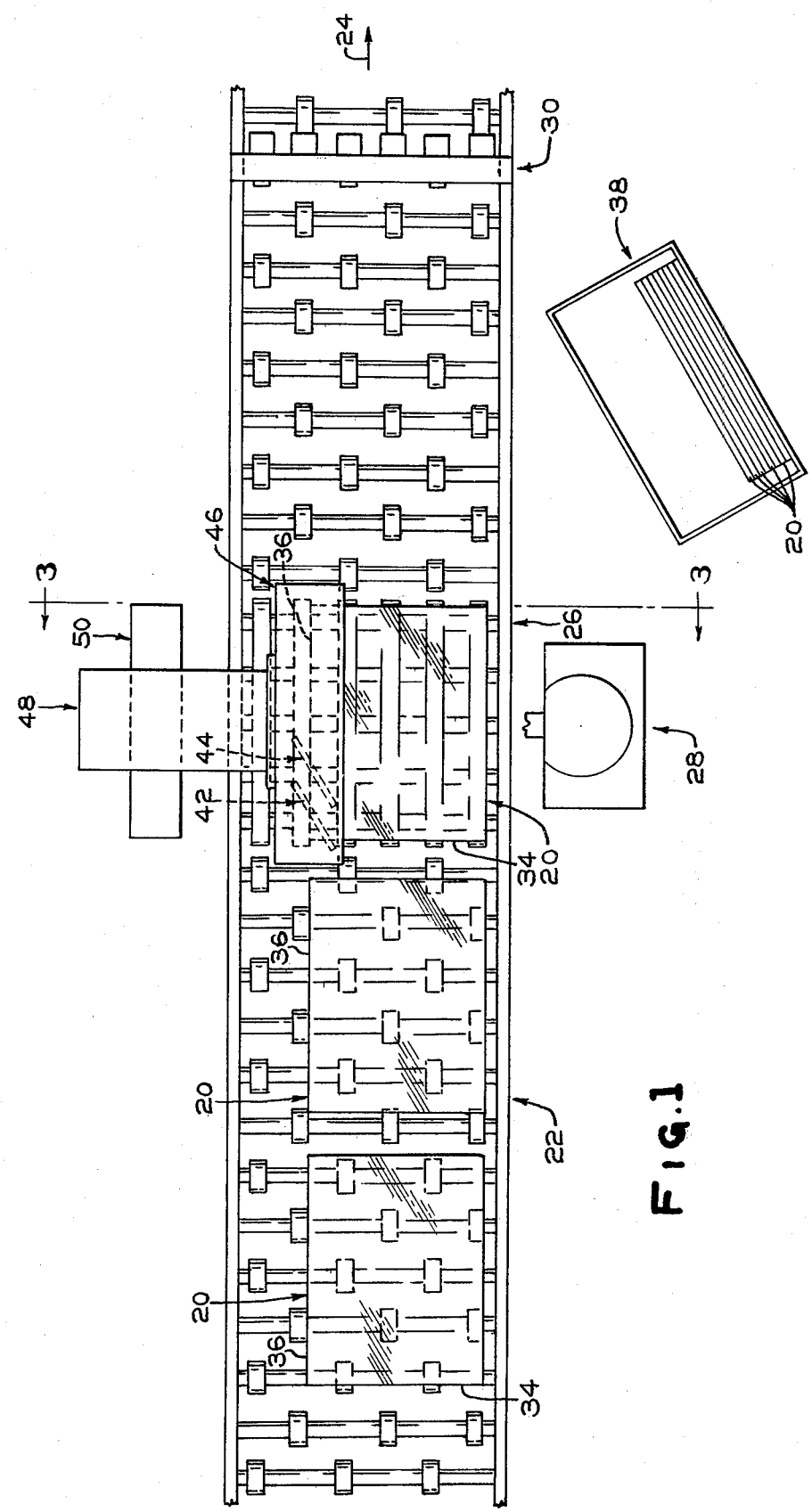

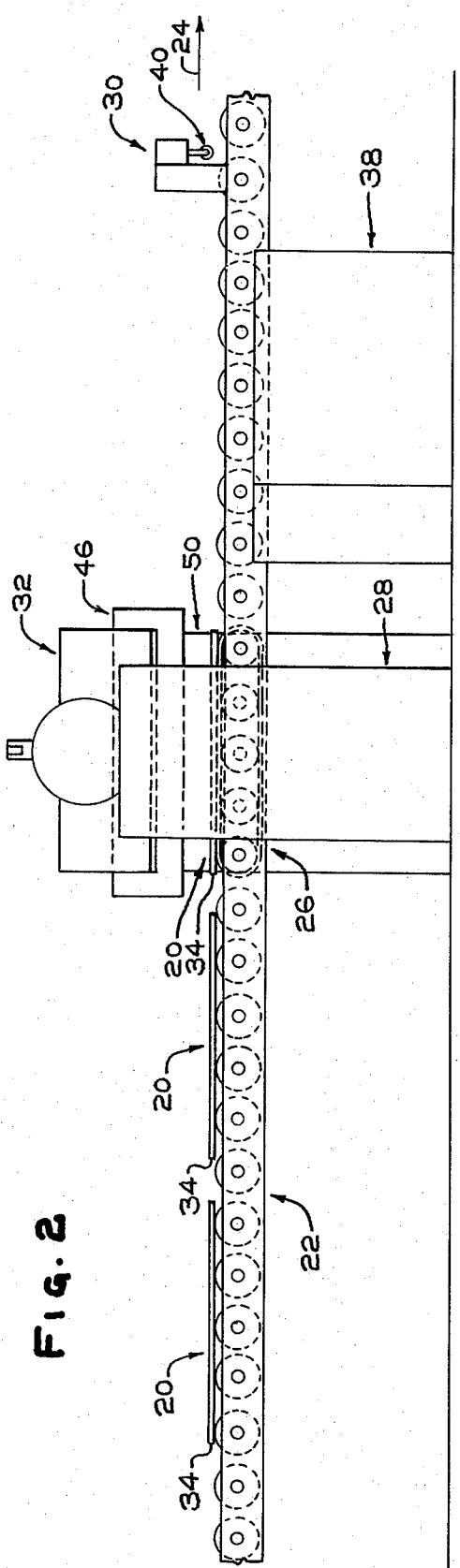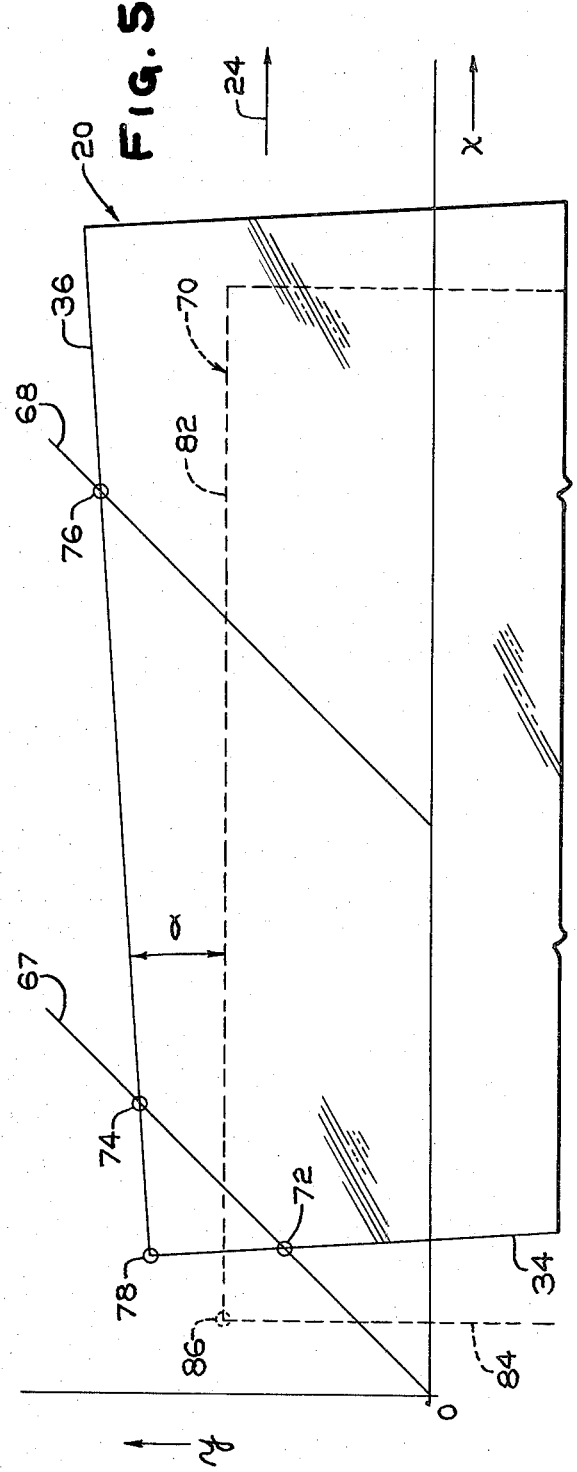

POSITION SENSOR

BACKGROUND OF THE INVENTION

1. Field of the Invention

This invention relates to a method of and apparatus for determining position of an article, e.g. glass sheet relative to a reference position.

2. Discussion of the Prior Art

Light generating and detecting apparatus, i.e., photo sensing apparatus are taught in the prior art. For example, U.S. Pat. Nos. 2,220,736; 2,662,633; 3,108,727 and 3,495,089 teach the use of photo sensing apparatuses for orienting, detecting and/or sensing the position of articles, e.g., cleats and webs. U.S. Pat. Nos. 3,489,909; 3,656,854 and 4,053,234 teach the use of photo sensing apparatuses for inspecting physical properties of material, e.g., internal defects in glass; sheet thicknesses and/or induced surface fractures. Although photo sensing apparatuses are used in the above-mentioned technologies, the use of photo sensing apparatuses in combination with industrial robots to move or orient articles, e.g., sheets is relatively unexplored.

Industrial robots, e.g., as taught in U.S. Pat. No. 3,958,682 are responsive to chain driven signal generators for tracking the advance of work pieces to act on the work pieces. For example, a sheet engaging frame of the type taught in U.S. Patent Application Ser. Nos. 901,944, filed May 1, 1978 in the name of William P. Cathers for "Sheet Orienting and Transporting Frame" and Ser. No. 902,003, filed on May 1, 1978 in the names of William P. Cathers and Charles W. Dorn, Jr. for "Frame Having Rotating and Orienting Members" are mounted on a robot arm. When the sheet is in a given position e.g., as indicated by a chain driven signal generator, the frame engages the sheet to align the sheet. Thereafter the sheet is engaged by the frame and loaded in a shipping container. The sheet is aligned by retractable side members mounted on the frame.

Although the frame and robot combination of the prior art as taught in the above-mentioned patent applications are acceptible, it would be advantageous to employ a noncontacting system for locating a sheet and thereafter programming a robot to reorientate the path of the frame to pickup the sheet. In this manner, any edge damage that may result from contact between edges of the sheet and engaging side members of the prior art frames would be eliminated.

SUMMARY OF THE INVENTION

This invention relates to a method of determining the orientation of an article, e.g., a glass sheet relative to a reference plane. A plurality of spaced energy fields are established in a given plane. Each of the energy fields have a predetermined relationship to one another and to the reference plane. The sheet is advanced along the given plane with at least one side of glass sheet intercepting at least two of the plurality of spaced energy fields and the other side of the article intercepting at least one of the plurality of spaced fields. The position of the fields intercepted by the sides of the sheet generate signals which are acted on to determine orientation of the sheet relative to the reference coordinate. The sheet orientation may be used to modify the control program of an industrial robot to change the path and position of its pick up frame. Thereafter the frame engages the sheet to reorientate the sheet or remove the sheet.

This invention also relates to an apparatus for practicing the method.

BRIEF DESCRIPTION OF THE DRAWING

FIG. 1 is a plan view of a work station having a sheet locating position incorporating features of the invention;

FIG. 2 is a side view of the work station shown in FIG. 1;

FIG. 5 is a sketch showing the relationship between the sheet and the reference position shown in phanthom which relationship is determined in accordance with the teachings of the invention.

DESCRIPTION OF THE INVENTION

Figure 3:
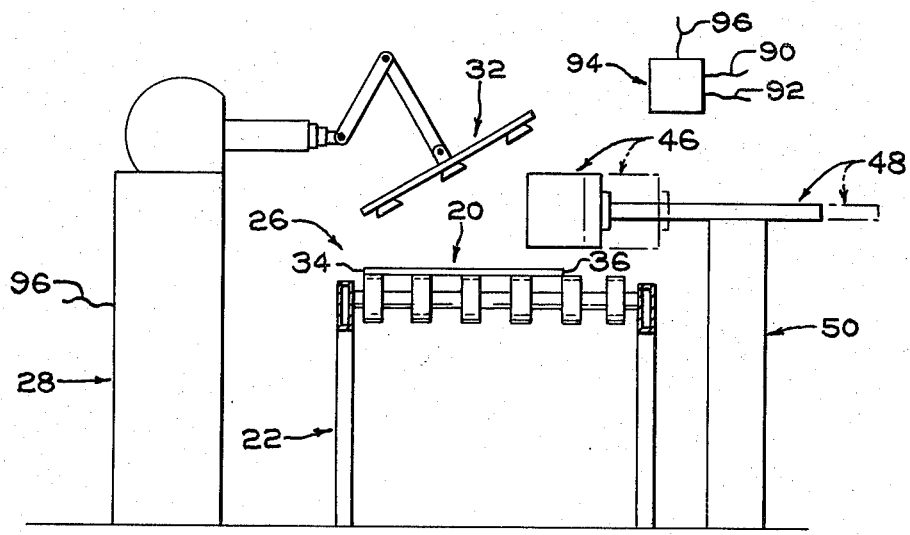
FIG. 3 is a view taken along lines 3—3 of FIG. 1.

With reference to FIGS. 1 and 2 sheets 20 are advance by conveyor 22 in the direction of arrow 24 to a sheet locating position 26. In the following discussion the sheet 20 is a glass sheet, however as will be appreciated the invention is not limited thereto. At the sheet locating position 26, the orientation of the sheet 20 is determined relative to a reference position, e.g., x,y coordinates in accordance with the teachings of the invention. Thereafter, the sheet orientation information is conveniently forwarded to an industrial robot 28 and/or scoring station 30.

When the sheet orientation information is forwarded to the industrial robot 28, the robot 28 is conveniently adjusted or altered so that pickup frame 32 (clearly shown in FIG. 3) engages each sheet at the same location. For example, the frame 32 and the sheet 20 each have a first side and a second side. When the orientation of the sheet is known relative to the reference position, the path of the frame 32 is adjusted such that (1) the first side of the frame 32 is generally parallel to the first side of the sheet, e.g., trailing edge 34 of the sheet 20 as shown in FIGS. 1 and 5 and spaced a predetermined distance therefrom and (2) the second side of the frame 32 is generally parallel to the second side of the sheet, e.g., top side 36 of the sheet 20 as shown in FIGS. 1 and 5 and spaced a predetermined distance therefrom. As can be appreciated, the position of the frame 32 within the sides of the sheet 20 changes as the sheet size changes. Although, the invention is not limited to the position of the frame 32 within the sides and edges of the sheet 20, it is recommended that the frame picks up the sheet 20 in such a manner as to minimize or eliminate bending moments as the sheet is moved from the conveyor 22. The sheet 20 engaged by the frame 32 is thereafter moved and conveniently loaded into a shipping container 38.

When the sheet orientation information is employed for scoring the sheet, the sheet may be reorientated by the frame 32. For example, the sheet 20 may be reorientated and thereafter advanced by the conveyor 22 and through the scoring station 30. The sheet orientation information may also be used to selectively move scoring assemblies 40 (see FIG. 2) located at the scoring station 30 to score the sheet. As will be appreciated, the invention is not limited to the scoring assemblies 40 and any of the types known in the art may be used in the practice of the invention. For example, the scoring assemblies taught in U.S. Pat. No. 4,102,227 and in U.S. Patent Application Ser. No. 801,712 filed on July 31, 1977 in the name of John A. Goldinger for "Scoring Device Having A Referencing Carriage" now U.S. Pat. No. 4,137,803 may be used in the practice of the invention. The teachings of the above-mentioned patent and patent application are hereby incorporated by reference.

The discussion will now be directed to determining sheet orientation in accordance to the teachings of the invention. With reference to FIG. 1, the sheet 20 in the sheet location position 26 has a portion of the side 36 and edge 34 spaced from a pair of sensors 42 and 44 mounted in housing 46. The housing 46 is not limiting to the invention and is used to prevent room lighting from affecting the sensors 42 and 44. The housing 46 is mounted on structural member 48 which is part of an elevator 50 for moving the housing 46 along a reciprocating vertical path and reciprocatng horizontal path relative to the plane of the conveyor 20. Once adjusted, the position of the housing 46 remains unchanged for a given sheet size.

Figure 4:
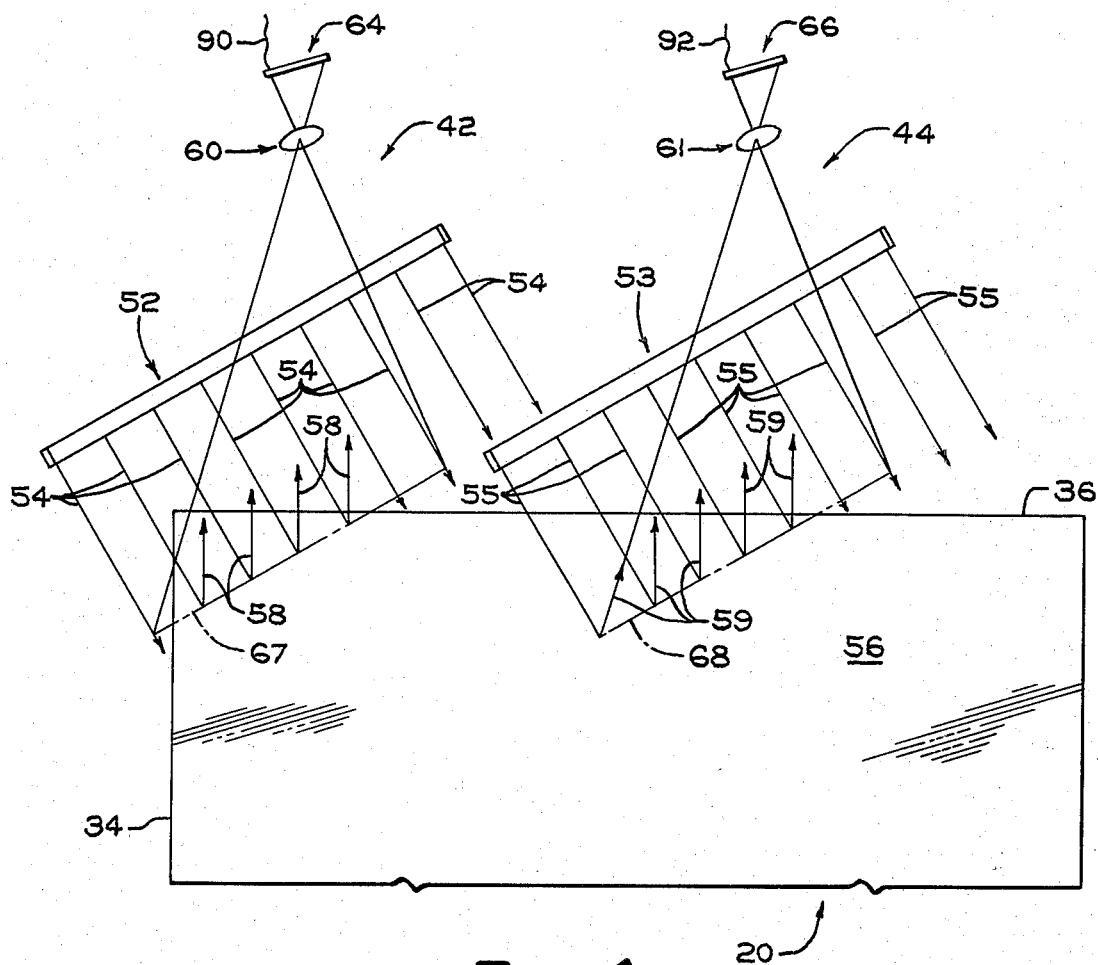
FIG. 4 is a diagrammatic sketch of a pair of sensors used in locating the position of a sheet relative to a reference position in accordance with the teachings of the invention.

With reference to FIG. 4, the sensors 42 and 44 are identical in construction and each include energy sources 52 and 53 respectively. Although not limiting to the invention, the energy sources 52 and 53 may be light sources, e.g., a converging light source; a diverging light source or a moveable light source, and preferably are of the type that direct uniformed diffused light rays or beams 54 and 55, respectively, toward the conveyor 22. When the sheet 22 is in the sheet locating position 26 a portion of the rays 54 and 55 are reflected from sheet surface 56 as reflected light rays 58 and 59 respectively. The reflected light rays 58 and 59 pass through a lens 60 and 61, respectively, and are incident on photo detectors 64 and 66, respectively. The lenses 60 and 61 mounted in front of their respective photo detectors 64 and 66 define the length of their respective scan path 67 and 68. The photo detectors 64 and 66 are not limiting to the invention and are of the type having a plurality of spaced photo diodes arranged in a linear array. The portion of the sheet 20 intersecting or lying in the scan paths 67 and/or 68 reflects the rays 58 and/or 59 through the lens 60 and/or 61 onto the photo detectors 64 and/or 66, respectively. The photo diodes having the reflected rays incident thereon are energized and generate a signal to define the length of the scan path occupied by the sheet.

Referring as required to either FIGS. 4 and/or 5, a scan path, e.g., 67 is preferably set such that (1) one end of the scan path defines origin 0 of the x,y axis and (2) subtends a 45° angle with the x,y axis. The other scan path, e.g., scan path 68 is preferably parallel to and spaced a predetermined distance from the scan path 67 as measured along the x axis. The orientation of the scan paths in relationship to each other and to the x,y axis is presented to conveniently illustrate the manner of determining sheet orientation and is not limiting to the invention.

Reference plane or position 70 shown in phantom is set relative to the x,y axis. The position of the reference plane 70 is not limiting to the invention and its position as shown in FIG. 5 is for illustration purposes only. Each of the discreet photo diodes of the detectors 64 and 66 have x,y coordinates. With this arrangement, the outermost photo diodes of the detector 64 responsive to the reflected rays 58 from the sheet surface 56 define the x,y coordinates for point 72 and x,y coordinates for point 74. The outermost photo diode of the detector 66 responsive to the reflected rays 59 defines the x,y coordinates for point 76. The x,y coordinates of the points 72, 74 and 76 can be used in any convenient manner to determine the x,y coordinates of the sheet corner 78 and the slope of the sheet side 36 relative to the x axis, i.e., angle $\alpha$. When side 82 of the reference plane 70 is set relative parallel to the x axis, the angle $\alpha$ measured between the sheet side 36 and plane side 82 is equal to the angle between the sheet side 36 and x axis. The position of corner 86 of the reference plane 70 is set at a predetermined position relative to the x,y axis. Using the x,y coordinates of the points 72, 74 and 76, the angle $\alpha$ and corner 78 of the sheet 20 can be determined. The angle $\alpha$ and x,y coordinate of the corner 78 can be related to the reference plane 70 to give the orientation of the sheet 20 relative to the reference plane 70.

The sheet orientation information is conveniently forwarded to the control program of the robot 28 to modify same so that the motion of the frame 32 is readjusted to engage the sheet 20 at a predetermined distance spaced from the edge 34 and side 36. The sheet 20 may be removed from the conveyor 20 and loaded onto the container 38. In the alternative, the sheet 20 may be reorientated so that it is coincident with the plane 70. Thereafter the frame 32 disengages the sheet and the sheet is advanced by the conveyor 20 through the scoring station 30 to score the reorientated sheet.

As can be appreciated, the invention contemplates the mounting of light sources 52 on one side of the conveyor 22 and the detectors 64 and 66 on the opposite side. This arrangement is recommended when the sheet has a nonreflective surface and/or is opaque, e.g., when the sheet is metal or wood. Further, the housing 46 containing the sensors 42 and 44 may be mounted below the conveyor rather than above the conveyor as shown in FIGS. 1 and 2. Still further the conveyor 22 is not limiting to the invention and may include donut rolls and/or endless belts to convey the sheets.

DETAILED DESCRIPTION OF THE INVENTION

The invention is practiced to load glass sheets 20 into container 38. Each of the glass sheets 20 to be packed have a rectangular shape having a width of about 34 inches (0.86 meters) as measured along side 36 and a length of about 78 inches (1.98 meters) as measured along edge 34 and a thickness of about ⅛ inch (0.32 centimeters). Industrial robot 28 of the type sold by Cincinnati Millicron, Model 6CHR, is programmed to move vacuum pickup frame 32 of the type used in the art to position the frame 32 within reference plane 70 (see FIG. 5) or relative to the reference plane 70. Thereafter the frame moves toward and then away from the conveyor 22 and moves into the container 38. As the frame 32 exits the container, the robot arm is decremented about ⅛ inch (0.32 centimeters) to provide tightly packed sheets in the container.

With reference to FIG. 5, the position within the reference plane 70 is selected such that the center of the frame 32 is spaced about 39 inches (0.99 meters) from side 82 and about 17 inches (43.15 centimeters) from edge 84 of the reference plane 70 which is about the center of the reference plane 70 and also about the center of the sheets 20. The side 82 of the reference plane is parallel to the x axis and the side 84 of the reference plane is parallel to the y axis. Corner 86 of the reference plane has an x,y coordinates of 3,7, respectively.

With reference to FIG. 4, a pair of sensors 42 and 44 are mounted in the housing 46 and the housing adjusted such that the sensors are spaced about 46 inches (1.17 meters) above the plane of the conveyor 22. As illustrated in FIG. 4, each of the sensors 42 and 44 include a photo detector 64 and 66 of the type sold by Reticon Corporation of Sunnyvale, Calif., Model No. RL-1024G-RC-106. The detectors 64 and 66 are parallel to one another and spaced about 16 inches (40.6 centimeters) apart. Each detector has 1024 spaced photo diodes. A 35–105 mm 3.5 automatic fixed mount zoom lens 60 and 61 of the type sold by Vivitar Corporation is mounted between the photo detectors 64 and 66, respectively, and conveyor 20. The lenses 60 and 61 are adjusted such that the field of view of each scan path 67 and 68 at the plane of the conveyor 20 is about 14.14 inches (35.9 centimeters) per 1000 photo diodes. The remaining 24 diodes of each detector 64 and 66 simply extend the scan paths 67 and 68 beyond the range specified and may properly be considered useable although this description will only consider the 1000 diode coverage as stated above. A pair of 20 watt cool white fluorescent tubes No. F20T62-CWI designated by numerals 52 and 53 are mounted in the housing 46 to direct light rays 54 and 55, respectively, toward the scan path 67 and 68, respectively. The tubes 52 and 53 are each about 22 inches long, (55.8 centimeters) spaced about 16 inches apart (40.6 centimeters) and spaced about 12 inches (30.4 centimeters) above the conveyor 20.

With reference to FIG. 5, the scan path 67 at one end, i.e., the 1st diode of the detector 64 has an x,y coordinate of 0,0 and the other end, i e., 1001 diode of the detector 64 has an x,y coordinates of 10,10. The scan path 68 has an x,y coordinates at one end, i.e., the 1st diode of the detector 66 of 16,0 and at the other end, i.e., the 1001st diode of the detector 66 of 26,10. With the above arrangements each diode has an incremental change along the x axis and along the y axis of about 0.01 inch (0.254 millimeters) for each photo diode along the scan path. In other words, the 5th diode of the detector 64 has an x,y coordinate of 5,5 and the 8th diode has an x,y coordinate of 8,8 and the distance therebetween on the x axis and on the y axis is 0.03 inch (0.76 millimeter).

Glass sheets 20 are advanced along the conveyor 22 to successively move the sheets into the sheet locating position 26. When a sheet 20 is moved under the housing 46 and has its sheet side 36 and sheet edge 34 in the scan path 68 the advance of sheet 20 is conveniently stopped.

With reference to FIG. 4, the light rays 54 and 55 incident on the portion of the sheet 20 in the scan paths 67 and 68 are reflected upward as reflected rays 58 and 59 respectively. The reflected rays 58 and 59 pass through the lenses 60 and 61 and are incident on a selected photo diode of the photo detectors 64 and 66, respectively. The reflected rays energize selected ones of the diodes which forward a signal along cables 90 and 92 to computer 94 shown in FIG. 3. By way of illustration, it is assumed that photo diodes 401 and 801 of the detector 64 are conducting which indicates that point 72 on the scan path 67 has an x,y coordinate of 4,4 and point 74 on the scan path 67 has an x,y coordinate of 8,8. The 901 photo diode of the sensor 66 is conducting indicating that the point 76 on the scan path 68 has an x,y coordinate of 25,9. The x coordinate is 25 which is the addition of the diode 901 having an x coordinate of 9 plus the distance between the 1st diode of the detector 66 and the origin of the x,y axis.

In the example, the slope of sheet side 36 is 1/17 as determined from Equation 1.

$$M = \frac{76y - 74y}{76x - 74x} \qquad \text{Equation 1}$$

where:

M is the slope of sheet side 36;

74x and 74y are the x,y coordinates for point 74 on the scan path 67; and 76x and 76y are the x,y coordinates for the point 76 on the scan path 68.

In the example, the position of corner 78 of the sheet 20 on the y axis, i.e., 78y is 7.74 as determined from Equation 2.

$$78y = \frac{M^2(72y) + M(72x - 74x) + 74y}{1 + M^2} \qquad \text{Equation 2}$$

where:

78y is the y coordinate of the sheet corner 78 when the sheet edge 34 and sheet side 36 subtend a 90° angle;

M, 74x and 74y are as previously defined; and;

72x and 72y are the x,y coordinates of the point 72 on the scan path 60.

In the example, the position of the corner 78 of the sheet 20 on the x axis is 3.8 as determined from Equation 3.

$$78x = -M(78y - 72y) + 72x \qquad \text{Equation 3}$$

where:

78x is the x coordinate of the sheet corner 78 when the sheet edge 34 and sheet side 36 subtend a 90° angle; and M, 72x, 72y and 78y are as previously defined.

Skew angle α in the example is 3.367° as determined from the slope (M) of sheet side 36. The sheet corner 78 has an x,y coordinate of 3.8 and 7.74 and is spaced 1.8 to 0.74 in the x and y direction respectively from the corner 86 of the reference plane 70. The skew angle and displacement of the sheet 20 from the reference plane, i.e., sheet orientation information determined by the computer 94 is forwarded to the program of the robot by way of cable 96 (see FIG. 3). The robot 28 as it moves toward the sheet 20 in the position 26 is adjusted in accordance with the recently received sheet orientation information to position the frame 32 over the center of the sheet 20. The frame 32 moves into engagement with the sheet 20, removes it from the conveyor and moves it toward the container 38. As the sheet 20 moves toward the container 38, the conveyor 20 is actuated to move the next sheet into the sheet orientation position 26 to determine its orientation relative to the reference plane 70 as previously discussed. The sheet secured to the frame 32 is mounted or positioned in the container 38. The program of the robot decrements the robot arm about ⅛ inch (0.32 centimeter) so that the next sheet to be loaded is urged against the recently packed sheet. As the arm moves toward the conveyor 20 to pickup the sheet in the sheet orientation position 26, the sheet orientation information is forwarded to the control program of the robot to readjust the movement of the frame 32 to engage the sheet at the sheet engaging position. The above is repeated until the container is filled.

To expedite container loading, a container may be positioned on each side of the robot 20. In this manner one container may be loaded while the other loaded container is removed and replaced by an empty container.

As can be appreciated, the above example is presented for illustration purposes only and is not limiting to the invention.

I claim:

1. A method of determining orientation of an article having first and second sides, the sides having a fixed relationship to one another, comprising the steps of:
   establishing at least two spaced energy fields having a fixed relationship with one another;
   providing at least two detectors each having coordinates;
   moving the energy fields and the article relative to one another to intersect one energy field by the first side and the other energy field by the first and second sides of the article;
   determining by way of the detectors intersection coordinates of the energy fields; and
   determining article orientation from the intersection coordinates and fixed relationship of the first and second sides of the article.

2. The method as set forth in claim 1 wherein the article has a reflective surface and said moving step includes the step of:
   directing light rays toward the reflective surface of the article; and
   said determining step includes the step of sensing light rays reflected from the surface of the article.

3. The method as set forth in claim 1 wherein said moving step includes the step of:
   directing light rays toward the article; and
   said determining step includes the step of sensing portion of the light rays moving past the article.

4. A method of handling a sheet using a sheet engaging frame moved along a given path in accordance to a controllable program, the sheet having first and second sides having a fixed relationship to one another, comprising the steps of:
   establishing at least two spaced energy fields having a predetermined relationship with one another;
   providing at least two detectors each having coordinates;
   moving the energy fields and the sheet relative to one another to intersect one energy field by the first side and the other energy fields by the first and second sides of the sheet;
   determining by way of the detectors intersection coordinates of the energy fields;
   determining sheet orientation from the intersection coordinates and fixed relationship of the first and second sides of the sheet;
   modifying the path of the frame in response to said determining step to position the frame over the sheet; and
   engaging the sheet by the frame.

5. The method as set forth in claim 4 wherein the sheet is a glass sheet and said engaging step includes the step of:
   orienting the sheet relative to glass scoring apparatuses.

6. The method as set forth in claim 4 wherein said engaging step includes the step of:
   lifting the sheet by way of the frame; and
   further including the step of loading the sheet in a container.

7. The method as set forth in claim 4 wherein the sheet has a reflective surface and said moving step includes the step of:
   directing light rays toward the reflective surface of the sheet; and
   said determining step includes the step of sensing the light rays reflected from the sheet surface.

8. The method as set forth in claim 7 wherein the sheet is a glass sheet having the first and second sides normal to one another; the at least two energy fields are two scan paths each lying on an x,y axis; the scan paths are parallel to one another and in a predetermined relationship to the x,y axis; the sheet has its two sides lying in the first scan path and the other side lying in the second scan path; and said sensing step includes the steps of:
   determining the x,y coordinates of the intersection of the first side of the sheet and the first scan path defined as $P_1$ and of the second side of the sheet and the first scan path defined as $P_2$;
   determining the x,y coordinates of the intersection of the second side of the sheet and the second scan path defined as $P_3$; and
   said step of determining sheet orientation includes the steps of:
   determining slope of the second side of the sheet relative to the x,y axis using $P_2$ and $P_3$;
   determining y coordinates of the intersection of the first and second side of the sheet on the x,y axis using the slope of the second sheet side, $P_1$, $P_2$ and $P_3$;
   determining the x coordinates of the first sheet side from y coordinate of the intersection of the first and second side of the sheet and $P_1$; and
   determining the skew angle of the second side relative to the x coordinate using the slope of the second side.

9. The method as set forth in claim 4 wherein said moving step includes the step of:
   directing light rays toward the sheet; and
   said determining step includes the step of sensing portion of the light rays moving past the sheet.

10. An apparatus for determining orintation of an article having first and second sides, the sides having a fixed relationship to one another, comprising:
    means for establishing at least two spaced energy fields having a fixed relationship with one another;
    means for indicating coordinates associated with each of said at least two energy fields and responsive to respective energy field;
    means for moving said at least two energy fields and article relative to one another to intersect one energy field by the first side and the other energy field by the first and second sides of the article;
    means responsive to said indicating means for generating intersection coordinate signals; and
    means acting on the intersection coordinate signals for determining orientation of the article.

11. The apparatus as set forth in claim 10 wherein said means for establishing said at least two spaced energy fields includes:
    means for directing light rays onto a predetermined location to establish the at least two spaced energy fields; and
    said indicating means each includes:

means for responding to light rays associated with the respective one of said energy fields.

12. The apparatus as set forth in claim 11 wherein said responding means includes:
   a pair of spaced sensors each having a plurality of spaced discrete photo diodes; and
   each of said establishing means includes; a fluorescent bulb.

13. The apparatus as set forth in claim 10 or 11 used in combination with a sheet engaging frame driven by a robot along a given path wherein the article is a sheet and further comprising:
   means responsive to said determining means and acting on the robot for modifying the path of the frame to orient the frame in the reference position.

* * * * *